(12) United States Patent
Mattes et al.

(10) Patent No.: US 6,725,961 B2
(45) Date of Patent: Apr. 27, 2004

(54) DEVICE AND METHOD FOR SIDE-IMPACT IDENTIFICATION

(75) Inventors: Bernhard Mattes, Sachsenheim (DE); Erich Zabler, Stutensee (DE); Pascal Kocher, Gerlingen (DE); Christoph Burbaum, Stuttgart (DE); Rolf-Juergen Recknagel, Jena (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/181,497
(22) PCT Filed: Oct. 19, 2001
(86) PCT No.: PCT/DE01/03991
§ 371 (c)(1), (2), (4) Date: Nov. 12, 2002
(87) PCT Pub. No.: WO02/40321
PCT Pub. Date: May 23, 2002

(65) Prior Publication Data
US 2003/0127270 A1 Jul. 10, 2003

(30) Foreign Application Priority Data
Nov. 18, 2000 (DE) .......................................... 100 57 258

(51) Int. Cl.⁷ ............................................... B60R 21/16
(52) U.S. Cl. ........................................ 180/274; 280/735
(58) Field of Search ................................ 180/274, 282; 280/734, 735; 701/45, 46, 47, 301

(56) References Cited

U.S. PATENT DOCUMENTS

| | | | |
|---|---|---|---|
| 5,320,382 A | * | 6/1994 | Goldstein et al. ........... 280/735 |
| 5,808,197 A | * | 9/1998 | Dao ........................ 73/514.09 |
| 6,081,758 A | * | 6/2000 | Parvulescu .................. 701/45 |

FOREIGN PATENT DOCUMENTS

| | | |
|---|---|---|
| DE | 39 42 343 | 6/1991 |
| EP | 0 667 822 | 8/1995 |

\* cited by examiner

Primary Examiner—Paul N. Dickson
Assistant Examiner—Laura B. Rosenberg
(74) Attorney, Agent, or Firm—Kenyon & Kenyon

(57) ABSTRACT

A device and a method, respectively, are proposed to detect side collisions, in which a temperature sensor is located in a motor-vehicle side section. In case of a side collision, the temperature sensor measures the short-term adiabatic temperature increase and a control device detects a side collision as a function of the measured temperature increase and the temperature gradient. A triggering decision is made by plausibility testing using an acceleration sensor.

9 Claims, 3 Drawing Sheets

DEVICE AND METHOD FOR SIDE-IMPACT IDENTIFICATION

BACKGROUND INFORMATION

The present invention is based on a device and a method for detecting side collisions according to the species defined in the independent claims.

A device for detecting side collisions is known from the European Patent EP-667 822, in which a pressure sensor is located in a side section of a vehicle body. When a side collision occurs, the adiabatic pressure increase in the side section is evaluated for side-collision detection. The side section is substantially closed in this case. Adiabatic means that the amount of heat remains constant.

SUMMARY OF THE INVENTION

The device and the method according to the present invention for detecting side collisions having the features of the independent claims have the advantage over the related art that a temperature sensor located in the side section of the vehicle body is less complicated than a pressure sensor. This results in cost savings. Also, no filtering of noise signals, such as acoustic frequencies, is required. Furthermore, the device according to the present invention and the method of the present invention are robust and react to actual deformations of the vehicle body. Thus, the method and the device according to the present invention are less sensitive with respect to events (driving through potholes, driving over the curb or slamming of the door) that suggest a side collision, but are not supposed to trigger a restraint system.

By the measures and further refinements mentioned in the dependent claims advantageous improvements of the device and the method for side-collision detection according to the present invention are made possible.

It is particularly advantageous that the temperature sensor is designed as a micromechanical sensor, so that the temperature sensor is easy to manufacture in mass production. The micromechanical sensor could be an extremely precise temperature sensor.

By designing a housing around the temperature sensor in the side section of the vehicle it is protected against radiation, and the adiabatic effect is increased since the air surrounding the temperature sensor is better insulated.

Using an acceleration sensor also has the advantage that a plausibility signal is generated, which is used to check a triggering signal obtained as a result of the temperature-sensor measurement. In this way, undesired triggering decisions for a restraining device and unnecessary injuries are prevented and costs are saved for the user of a restraint system. As an alternative, it is also possible that the acceleration sensor makes the triggering decision, and the temperature sensor generates the plausibility signal.

Furthermore, it is advantageous that the restraint devices are only triggered if the absolute temperature change and a temperature gradient exceed specified threshold values. It is ascertained especially with the temperature gradient that the temperature increase is short-term, so that a warming as a result of the vehicle being exposed to sunlight does not lead to an undesired triggering.

Finally, it is also advantageous, on the one hand, that redundancy is obtained by arranging a plurality of temperature sensors in a side section of a vehicle and, on the other hand, a temperature sensor will in each case be located near a deformation location of the side section.

BRIEF DESCRIPTION OF THE DRAWINGS

Exemplary embodiments of the present invention are shown in the drawings and are explained in detail in the following description.

The Figures show.

DESCRIPTION

Restraining systems, such as airbags, find increasing use in motor vehicles. Primarily, it is important in this context to rapidly detect an accident so that restraining means such as airbags and belt tighteners may be used efficiently. However, it is equally important to prevent an undesired triggering of restraining devices. Especially in a side collision the reaction time for the side-collision sensor system and the control system of the restraint systems is considerably shorter than in a head-on collision. A side collision in a side section of the passenger compartment should be detected early by the beginning deformation of the side section. Since side sections often constitute a substantially closed body, i.e., a cavity, an adiabatic pressure increase results in response to a deformation of the side section, which is accompanied by an adiabatic, rapid temperature increase. According to the present invention, at least one correspondingly fast temperature sensor is located in a side section of a vehicle, to detect side collisions. The collision force and/or the collision speed are ascertained by evaluating the absolute temperature increase and the temperature gradient, and the assurance is obtained that an adiabatic temperature increase is involved. The impact force and/or the impact speed may be determined based on the degree of deformation of the side section within a specified period of time. Combining the temperature sensor with an acceleration sensor allows a plausibility check of the temperature sensor's side-collision signal. Thus, it is ascertained whether an actual side collision is involved and not a temperature increase caused, for instance, by a welding torch.

The fast temperature sensor may be advantageously designed as a micromechanical temperature sensor. Micromechanics make a temperature sensor possible that is capable of very precise temperature measurements, and a micromechanical sensor is easy to produce in mass production.

Figure 1:
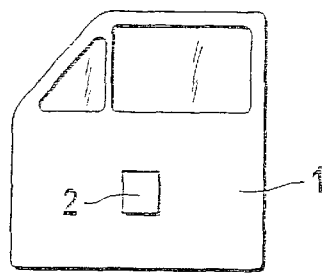
FIG. 1 a side section with a temperature sensor.

FIG. 1 shows a side section 1 of a vehicle in which a temperature sensor 2 is located. Side section 1, here a vehicle door, has temperature sensor 2 in a cavity of the side door, depicted here as a functional block. Not shown is the evaluating electronic system, which may either be arranged in side door 1 together with temperature sensor 2 or may be arranged externally at some other location in the motor vehicle. A measurement amplifier, for instance, may be integrated on the chip with the temperature sensor, while digitization is carried out in a control device.

Figure 2:
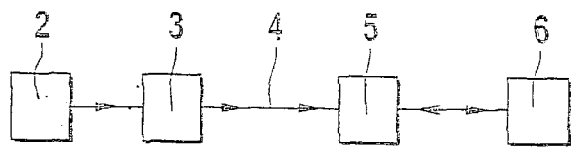
FIG. 2 a block diagram of the device according to the present invention.

FIG. 2 shows a block diagram of the device according to the present invention. Temperature sensor 2 is connected to an input of a signal-processing unit 3. A data output of signal processing unit 3 leads to a vehicle bus 4 to which a control device 5 is connected. Control device 5 is connected to restraint means 6 via a data input/output. Component parts of the electronic system, i.e., the measurement-value amplifier and the analog-digital converter, may be arranged in alternative fashion as described above.

Temperature sensor 2 generates electrical signals corresponding to the temperature, which are amplified and digitized by signal-processing unit 3. These digital data are then transmitted via bus 4 to control device 5, which processes the digital data in such a way that the absolute temperature increase is compared to a specified threshold value and the temperature gradient is also compared. The temperature gradient indicates the temperature change per time. In this manner it is ascertainable whether an adiabatic air-pressure increase is involved or not. In an adiabatic process, the temperature increase must occur within a very brief period of time. If the absolute temperature increase and also the temperature gradient exceed specified threshold values, which were experimentally determined, a triggering signal will be generated that will be checked with a measuring signal of an acceleration sensor, if necessary. The measuring signal of the acceleration sensor indicates whether a side collision could indeed be involved or not. Thus, a plausibility check is carried out. If even this measuring signal is above a specified enabling threshold, the triggering decision is accepted and restraint means 6 are triggered. Airbags and belt tighteners are such restraint means 6.

Figure 3:
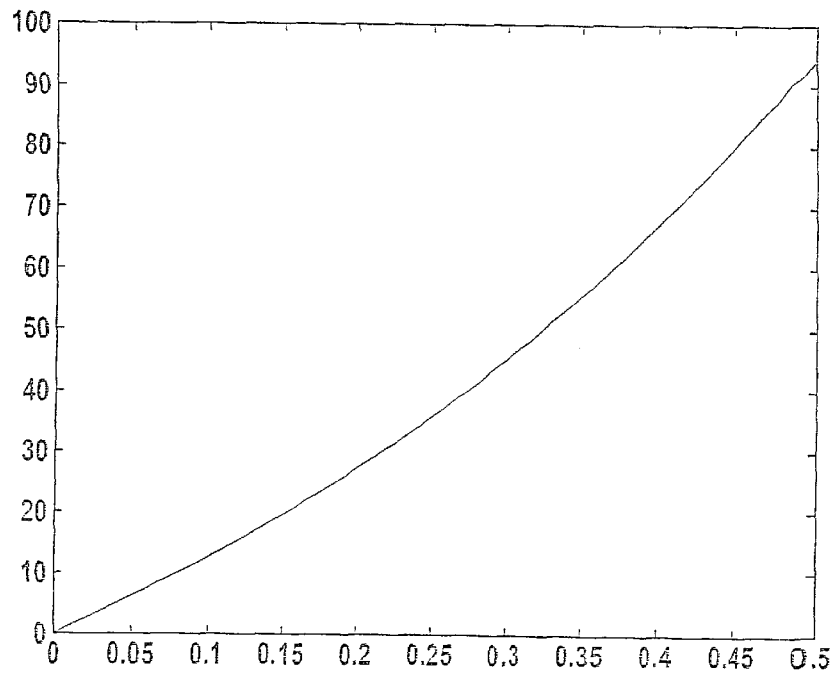
FIG. 3 a diagram comparing the temperature change with the relative volume change.

FIG. 3 shows a diagram which relates the temperature change in a side section of a vehicle implemented as a cavity to the relative volume change. For instance, in case of a volume change of approx. 10%, a temperature increase of 13 Kelvin will already be obtained. This ensures that a side collision is already detected at an early deformation and a triggering decision may be generated. Since the door is not perfectly sealed, air escapes from the door during and after the side collision, so that soon after deformation the pressure and temperature will have reached approximately the values that prevailed before the side collision. This means that a lower degree of sealing of the door will result in decreased sensitivity of the side-collision detection according to the present invention. A relationship exists between the air temperature prior to the event, temperature To, the temperature increase ΔT and the volume change ΔV. In the leading area for small times (in the milli-second range), the pressure loss after the side collision due to door permeability is negligent, and the following result will be achieved for the adiabatic state change with the aid of measured temperature $T_0+$, $$\Delta T : \Delta T = T_0 \left( \left( \frac{V_0 - \Delta V}{V_0} \right)^{1-K} - 1 \right) \text{ with } K \text{ being the adiabatic}$$

exponent of the air and $V_0$ the door volume. From this, temperature change ΔT may be estimated, an ambient temperature of $T_0$=293 Kelvin and a decrease in the door volume of 10% resulting in a temperature increase of approximately 13 Kelvin.

Figure 4:
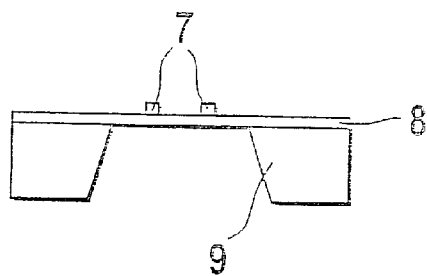
FIG. 4 a micromechanical temperature sensor in side view.

FIG. 4 shows a side view of a micromechanical temperature sensor, which is arranged in a side section of the motor vehicle according to the present invention. A temperature sensor 7 made of platinum is implemented on a membrane 8 having poor thermal conductivity. Membrane 8, in turn, is arranged on a silicon frame 9 produced by means of microstructuring. Membrane 8, in this case, is made either of silicon dioxide or of silicon nitride, which are known dielectrics in semiconductor technology. These dielectrics have poor electric conductivity and thus also poor thermal conductivity. As an alternative, other dielectrics may be used.

Temperature sensor 7 is implemented as a platinum thin-layer element and has a temperature-dependent resistor. Thus, the temperature on membrane 8 may be inferred by measuring the resistance of the platinum element. Since the thermal capacity of membrane 8 is very low due to minimal thickness and low mass, membrane 8 very quickly assumes the temperature of the ambient air. Due to its low thermal conductivity, membrane 8 is thermally decoupled from the silicon frame and the body shell connected thereto, so that a temperature increase of the platinum element may occur without the thermally inert body shell, which has a large mass with a large heat capacity, having to be heated also.

Figure 5:
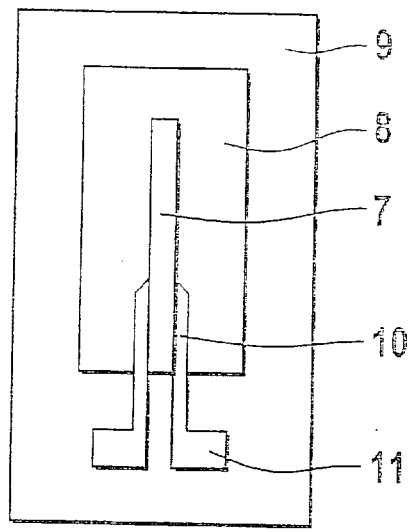
FIG. 5 a top view of the micromechanical temperature sensor.

FIG. 5 shows a top view of the micromechanical temperature sensor. Membrane 8 is located on silicon frame 9. Platinum sensor 7 has conductors 10 (printed circuit traces) leading to so-called bond pads to which the terminal wires, which provide the connection to other electrical or electronic components, must be soldered or bonded.

Figure 6:
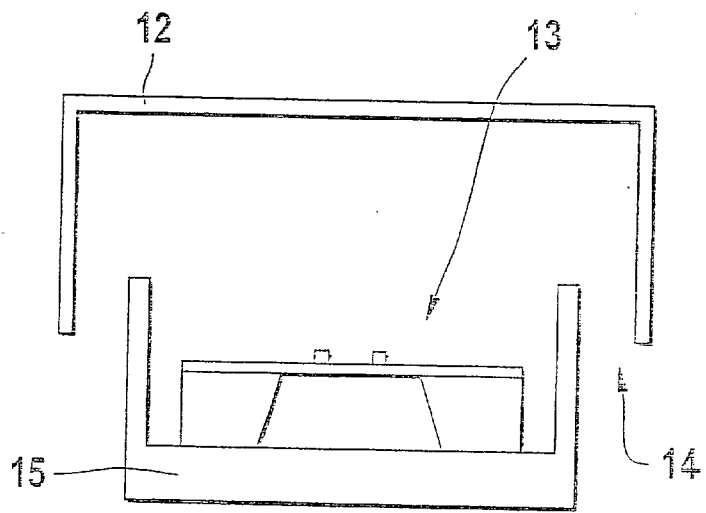
FIG. 6 the micromechanical temperature sensor in a housing.

In FIG. 6, micromechanical temperature 13 shown in FIGS. 4 and 5 is accommodated in a housing. The housing includes a housing base 15 to which temperature sensor 13 is attached, and a housing top 12 having an opening 14 through which a pressure change in the ambient air is transmitted. If an adiabatic process is involved, this pressure change is accompanied by a temperature change.

Figure 7:
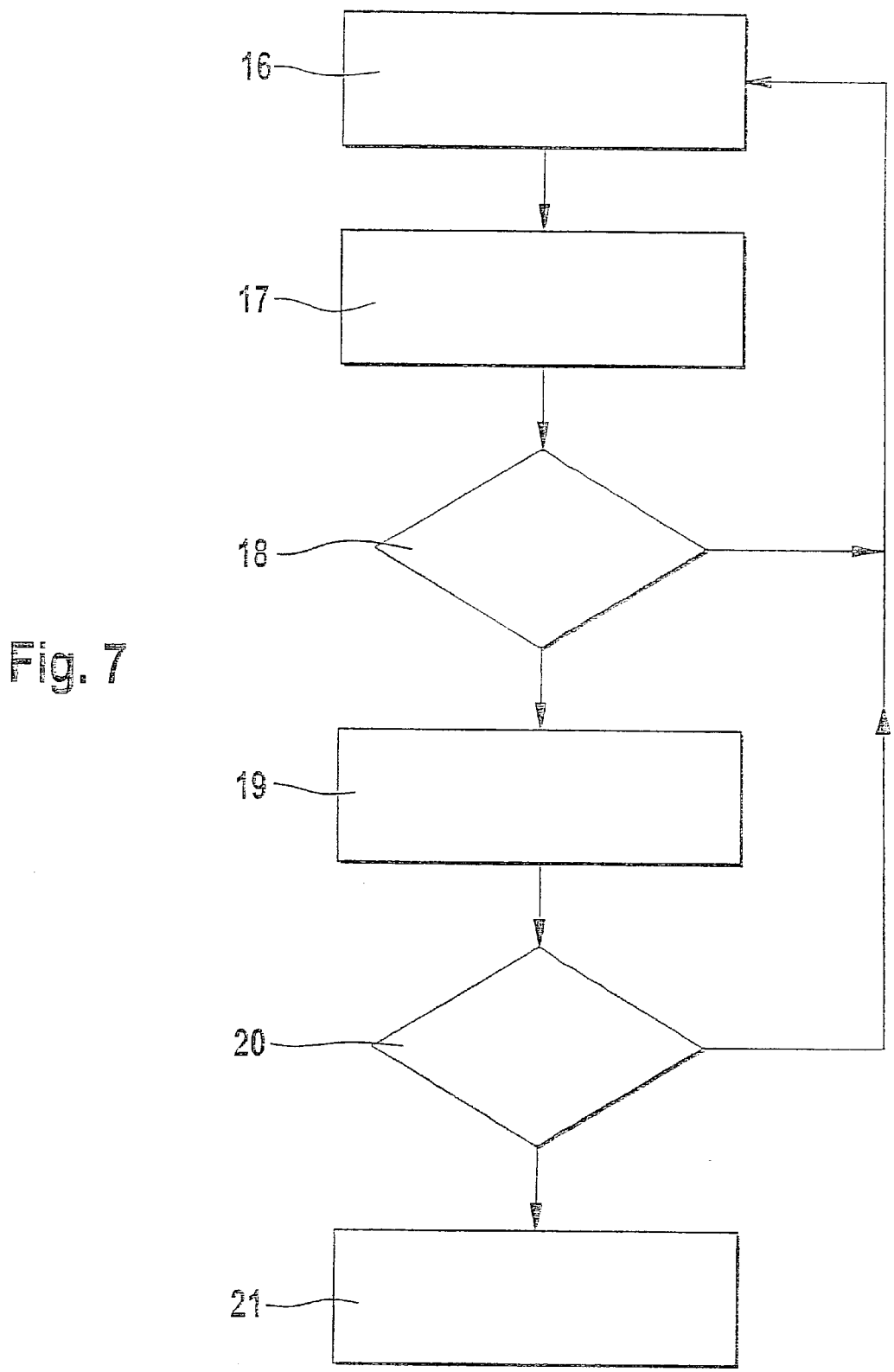
FIG. 7 a flow chart of the method according to the present invention.

In FIG. 7, the method according to the present invention is represented as a flow chart. In method step 16, a temperature signal from temperature sensor 2 is amplified by signal processor 3 and digitized and transmitted to control device 5. In method step 17, control device 5 calculates the absolute temperature increase and the temperature gradient. In method step 18, the absolute temperature increase and the temperature gradient are compared to predefined threshold values to ascertain whether a side collision has occurred or not. If both threshold values are exceeded, a side collision is present, and this detected side collision is checked in method step 19 using signals from an acceleration sensor. If the signal from an acceleration sensor is also above an enabling threshold, i.e., the acceleration in the lateral direction of a vehicle, it will then be determined in method step 20 that it exceeds an enabling threshold, and a triggering decision will be transmitted to restraint means 6 in method step 21.

If it was determined in method step 18 that either the absolute temperature increase or the temperature gradient is below the individually specified threshold value, a return to method step 16 is implemented, and the instantaneous temperature value is checked. If it was detected in method step 20 that the signal of the acceleration sensor is below the specified enabling threshold, a return to method step 16 is also implemented to call up the ambient-temperature signal.

Rapid information regarding the thus occurring temperature increase ΔT may also be obtained by a slower temperature sensor, by measuring the temperature gradient. In the first 20 ms after deformation begins, the temperature increase occurs according to an exponential function:

$$T(t) = \Delta T (1 - e^{-t/\tau})$$

τ is the thermal time constant of the air-temperature change in the vehicle cavity. It is experimentally determined and is assumed to be constant over the temperature and service life.

If this temperature is measured, for instance, after 0.5 ms and after 2 ms, the following is obtained:

$T(0.5\ ms) = \Delta T(1 - e^{-0.5\ ms/\tau})$, and $T(2\ ms) = \Delta T(1 - e^{-2\ ms/\tau})$, respectively, and thus $\Delta T = (T(2\ ms) - T(0.5\ ms)):(e^{-0.5\ ms/\tau} - e^{-2\ ms/\tau})$ The relatively slow temperature sensor assumes temperature increase ΔT, for example, only after 50 ms, that is, much too late. Nevertheless, with the aid of this "trick", information regarding the occurring ΔT is obtained already after 2 ms and then compared to a specified threshold value to detect a side collision.

An alternative method is to evaluate the first derivative of the temperature variation. The actual temperature increase must be seen as a jump function, which is made of a thermal substitute circuit diagram of the temperature sensor, made of a thermal resistor r and a thermal capacitance. The temperature is tapped off by way of the thermal capacitance. A differential equation results from the analog voltage cycle and the current equation, the differential equation simulating the jump function by a sum of the weighted first time derivative of the temperature variation and the temperature variation per se. The weighting results from the values for the thermal resistance and the thermal capacitance, which depend on the technological properties of the temperature sensor. Using a slow sensor, information regarding the temperature rise may already be available after a few ms. In a further refinement it is provided that only the first time derivative of the temperature variation is used to predict the temperature rise.

What is claimed is:

1. A system for detecting a collision on a side section of a vehicle body, comprising:
    a control device; and
    at least one temperature sensor located in the side section of the vehicle body and electrically connected to the control device, wherein the control device uses electrical temperature signals of the at least one temperature sensor to detect a temperature change indicating a side collision.

2. The system of claim 1, wherein the at least one temperature sensor is a micromechanical sensor.

3. The system of claim 1, wherein the at least one temperature sensor is accommodated in a housing in the side section of the vehicle body.

4. The system of claim 1, further comprising at least one acceleration sensor electrically connected to the control device.

5. The system of claim 4, wherein the vehicle has a restraint system, and wherein the control device makes a second comparison of an enabling threshold value with a signal of the at least one acceleration sensor, and wherein the control device triggers the restraint system if the signal of the at least one acceleration sensor exceeds the enabling threshold.

6. The system of claim 1, wherein the vehicle has a restraint system, and wherein the control device determines from the temperature signals of the at least one temperature sensor at least one of a temperature change and a time derivative of the temperature change, and
    wherein the control device makes a comparison of at least one threshold value to at least one of the temperature change and the time derivative of the temperature change, and
    wherein the control device triggers the restraint system based on the comparison.

7. A method for detecting a collision on a side section of a vehicle, the vehicle having a restraint system, the method comprising:
    generating temperature signals from a sensor located in the side section of the vehicle; and
    using the temperature signals to detect a temperature change in the side section of the vehicle, whereby a side collision is detected based on the change in the temperature.

8. The method of claim 7, further comprising:
    determining, from the temperature change, a time derivative of the temperature change;
    comparing at least one threshold value to at least one of the temperature change and the time derivative of the temperature; and
    making a control decision to trigger the restraint system based on the comparison.

9. The method of claim 8, further comprising:
    using an acceleration sensor to generate an acceleration signal;
    comparing an enabling threshold value to the acceleration signal; and
    triggering the restraint system if the acceleration signal is greater than the enabling threshold value.

* * * * *

UNITED STATES PATENT AND TRADEMARK OFFICE
CERTIFICATE OF CORRECTION

PATENT NO. : 6,725,961 B2
DATED : April 27, 2004
INVENTOR(S) : Mattes et al.

It is certified that error appears in the above-identified patent and that said Letters Patent is hereby corrected as shown below:

Title page,
Item [57], ABSTRACT, change "A device...sensor." to -- A device and method for detecting side collisions are provided. In one embodiment of the invention, a temperature sensor is located in a motor-vehicle side panel, and the temperature sensor generates a temperature signal that is used to detect the short-term adiabatic temperature increase caused by the rapid change in volume of a cavity in the side panel that occurs during a side collision. A micromechanical temperature sensor is disclosed that responds rapidly to a temperature change. Alternative embodiments detect the side collision by analyzing the temperature change of a temperature sensor having a slower response. For example, a control device detects the side collision as a function of the measured temperature increase and a rate of change in the measured temperature. In a specific embodiment, the control device makes a triggering decision, but a restraint system is triggered only after the additional check of a plausibility test using an acceleration sensor. --.

Column 1,
Line 5, change "BACKGROUND INFORMATION" to -- FIELD OF THE INVENTION --.
Line 7, change "is based on" to -- relates to --.
Line 8, delete "according to the species defined in the independent claims".
Lines 9-10, insert -- BACKGROUND OF THE INVENTION
Restraining systems, such as airbags, finding increasing use in motor vehicles. Primarily, it is important in this context to rapidly detect an accident so that restraining means such as airbags and belt tighteners may be used efficiently. However, it is equally important to prevent an undesired triggering of restraining devices. Especially in a side collision the reaction time for the side-collision sensor system and the control system of the restraint systems is considerably shorter than in a head-on collision. A side collision in a side panel of the passenger compartment should be detected early as the deformation of the side panel side panel is beginning. Since side panels often constitute a substantially closed body, i.e., a cavity, an adiabatic pressure increase results in response to a deformation of the side panel, which is accompanied by an adiabatic, rapid temperature increase.--

Line 10, change "known from the" to -- disclosed in --.
Lines 12, 14, 15, 22, 44, 65 and 67, change "section" to -- panel --.
Lines 19-22, change "The device...art that" to -- One embodiment of the Invention uses --.
Line 24, change "less complicated than a pressure sensor" to -- to detect a side collision --.
Line 24, change "cost savings. Also, no" to -- cost savings, and --.
Line 25, change "is required." to -- is not required --.
Lines 29-32, change "are less sensitive with respect to events such as (driving through potholes, driving over the curb or slamming of the door) that suggest a side collision but" to -- detect side collisions without erroneously confusing a side collision with an event such as driving through potholes, driving over the curb, or slamming of the door, which --.

UNITED STATES PATENT AND TRADEMARK OFFICE
CERTIFICATE OF CORRECTION

PATENT NO. : 6,725,961 B2
DATED : April 27, 2004
INVENTOR(S) : Mattes et al.

It is certified that error appears in the above-identified patent and that said Letters Patent is hereby corrected as shown below:

Column 1 (cont'd),
Lines 33-36, delete "By the measures……..are made possible.".
Line 37, change "It is particularly advantageous that" to -- In one embodiment --.
Line 38, delete "designed as".
Line 38, change "so that" to -- and --.
Line 39, change "manufacture in mass production." to -- mass produce. --.
Line 47, change "sensor also has the advantage that" to -- sensor, in one embodiment, --.
Line 48, change "signal is" to -- signal may be --.
Line 48, change "which is" to -- which may be --.
Line 50, change "In this way," to -- Using a device and method according to this embodiment, --.
Line 53, change "As an" to -- As one --.
Line 54, change "sensor makes" to -- sensor is used to make --.
Line 54, change "and" to -- while --.
Line 56, change "Furthermore, it is advantageous that" to -- In one specific embodiment, --.
Line 58, change "It is ascertained especially with the temperature gradient that the temperature increase in short-term, so that a warming as a result of the vehicle being exposed to sunlight does not lead to an undesired triggering." to -- In this embodiment, the temperature gradient may be used to discern a rapid, short-term temperature change from a more gradual, long-term trend in the temperature, such as the heating caused by exposure to sunlight, avoiding erroneous triggering. --.
Line 63, change "Finally, it is also advantageous, on the other hand, that" to -- In another specific embodiment, --.
Line 65, change "and, on the other hand, a" to -- . A plurality of --.
Line 66, change "sensor will" to -- sensor ensures that at least one temperature --.

Column 2,
Lines 1-20, delete "BRIEF DESCRIPTION……..according to the present invention." to
-- BRIEF DESCRIPTION OF THE DRAWINGS

Fig. 1 shows a schematic representation of one embodiment of a temperature sensor located in a side panel according to the present invention.
    Fig. 2 is a block diagram used to illustrate embodiments of the invention.
    Fig. 3 shows a graph of the temperature change in K versus the relative volume change.
    Fig. 4 illustrates a side view of an embodiment of a micromechanical sensor for measuring the temperature in a side panel.
    Fig. 5 illustrates the top view of the micromechanical sensor of Fig. 4.
    Fig. 6 shows the micromechanical sensor of Fig. 4 in a housing, according to one embodiment of the invention.
    Fig. 7 is a flow chart used to illustrate the method according to one embodiment of the invention.--

UNITED STATES PATENT AND TRADEMARK OFFICE
CERTIFICATE OF CORRECTION

PATENT NO. : 6,725,961 B2
DATED : April 27, 2004
INVENTOR(S) : Mattes et al.

It is certified that error appears in the above-identified patent and that said Letters Patent is hereby corrected as shown below:

Column 2 (cont'd),
Line 22, change "DESCRIPTION" to -- DETAILED DESCRIPTION --.
Lines 23-37, change "Restraining systems,......increase. According to the present invention," to -- In one embodiment of the invention, --.
Line 38, delete "correspondingly fast".
Line 39, change "sensor is" to -- sensor that responds rapidly to temperature changes is --.
Lines 39 and 45, change "section" to -- panel --.
Line 41, delete "absolute".
Lines 42-43, change "and the assurance is obtained that an adiabatic temperature increase is involved" to -- thereby insuring that the temperature increase is adiabatic. --.
Line 45, change "based on" to -- from the temperature increase and rate of change of the temperature increase over time, which corresponds to --.
Line 47, change "sensor allows" to -- sensor, in one specific embodiment, allows --.
Line 48, change "side-collision" to -- temperature --.
Lines 52-53, change "The fast temperature sensor may be advantageously designed as a micromechanical temperature sensor" to -- In one embodiment, the temperature sensor is a micromechanical sensor, also referred to herein as micromechanical sensor. --.
Lines 58-61, change "Fig. 1 shows a side section 1 of a vehicle in which a temperature sensor 2 is located in a cavity of the side door, depicted here as a functional block." to -- Fig. 1 illustrates one embodiment of a side panel 1 of a vehicle, for example a vehicle door, in which a functional block represents a temperature sensor 2 that is located in a cavity that is defined by the walls of the side panel. --.
Line 63, change "side door 1 together with temperature" to -- the side panel together with the temperature --.
Line 65, change "instance" to -- example --.
Lines 66-67, change "while digitization" to -- while analog to digital conversion, also known as "digitization", --.

Column 3,
Lines 1-2, change "Fig 2 shows a block diagram of the device according to the present invention. Temperature" to -- Fig. 2 shows a block diagram used for illustrating an embodiment of the invention. The temperature --.
Line 5, change "Control" to -- The control --.
Line 6, change "to restraint means 6 via a data input/output." to -- to a restraint device 6 via a data bus. --.
Line 10, change "Temperature sensor 2 generates electrical signals" to -- The temperature sensor 2 generates temperature signals --.
Line 11, change "which are" to -- which, in this embodiment, are --.
Line 12, change "by signal-" to -- by the signal --.
Line 13, change "via bus 4 to control device 5 which processes the digital data in such a way that the absolute" to -- via the data bus 4 to the control device 5, and then the digital data, according to one specific embodiment, are processed in such a way that the --.

UNITED STATES PATENT AND TRADEMARK OFFICE
CERTIFICATE OF CORRECTION

PATENT NO. : 6,725,961 B2
DATED : April 27, 2004
INVENTOR(S) : Mattes et al.

It is certified that error appears in the above-identified patent and that said Letters Patent is hereby corrected as shown below:

Column 3 (cont'd),
Line 17, change "the temperature change per time. In this manner it is ascertainable" to -- the rate of temperature change over time. The control device detects --.
Line 20, delete "absolute".
Line 22, change "determined, a triggering signal will be generated that will be checked with a measuring signal of an acceleration sensor, if necessary. The measuring" to -- predetermined, a triggering signal may be generated. Alternatively, the control system may also check that an acceleration signal from an acceleration sensor is greater than another threshold value, as a plausibility check, before triggering the restraint system. The acceleration --.
Line 26, change "Thus, a plausibility check is carried out. If even this measuring signal is above a specified enabling threshold, the triggering decision is accepted and restraint means 6 are triggered. Airbags and belt tighteners are such restraints means 6" to -- Thus, the plausibility check first determines if the acceleration signal is greater than a specified enabling threshold value, before any triggering decision is accepted and before any restraint device 6 is triggered. For example, airbags and belt tighteners are such restraint devices 6. --.
Line 32, change "section" to -- panel --.
Line 35, delete "already".
Line 37, change "generated" to -- made --.
Line 49, change "negligent" to -- negligible --.
Line 63, change "arranged in a side section" to -- located in a side panel --.
Line 64, change "according to the" to -- according to the one embodiment of the --.
Line 66, change "Membrane" to -- The membrane --.

Column 4,
Line 1, change "Membrane 8, in this case," to -- The membrane 8, in one specific embodiment, --.
Lines 7-8, change "Temperature sensor 7 is implemented as a platinum thin-layer element and has a temperature-dependent resistor." to -- The micromechanical sensor is implemented, for example, as a platinum thin-layer element 7 having a temperature-dependent resistance --.
Lines 9, 11 and 12, change "membrane" to -- the membrane --.
Line 11, change "thermal capacity of membrane" to -- thermal heat capacity of the membrane --.
Line 16, change "occur without" to -- occur more rapidly and without --.
Line 19, change "the micromechanical temperature sensor" to -- the embodiment of the micromechanical temperature sensor illustrated in Fig. 4. --.
Line 25, change "In Fig. 6, micromechanical temperature 13 shown in Figs. 4 and 5 is accommodated in a housing" to -- Fig. 6 illustrates a micromechanical sensor is accommodated by a housing. --.

UNITED STATES PATENT AND TRADEMARK OFFICE
CERTIFICATE OF CORRECTION

PATENT NO. : 6,725,961 B2
DATED : April 27, 2004
INVENTOR(S) : Mattes et al.

It is certified that error appears in the above-identified patent and that said Letters Patent is hereby corrected as shown below:

Column 4 (cont'd),
Line 29, change "change in the ambient air is transmitted." to -- change in the air enclosed by the panel is transmitted. --.
Lines 32-37, change "In Fig. 7, the method according to the present invention is represented as a flow chart. In method step 16, a temperature from temperature sensor 2 is amplified by signal processor 3 and digitized and transmitted to control device 5. In method step 17, control device 5 calculates the absolute temperature" to -- Referring to the flow chart of Fig. 7, one embodiment of the method of detecting a side collision uses the temperature signal from a temperature sensor 2, which is amplified by a signal processor 3 and digitized and transmitted to a control device 5 in the step of generating temperature signals 16. In the step of using the temperature signals 17, the control device calculates, for example, the temperature --.
Line 38, change "In method step 18, the absolute" to -- In the step of detecting a side collision 18, for example, the --.
Lines 41-48, change "collision is present, and this detected side collision is checked in method step 19. If the signal from an acceleration sensor is also above an enabling threshold, i.e., the acceleration in the lateral direction of a vehicle, it will then be determined in method step 20 that it exceeds an enabling threshold, and a triggering decision will be transmitted to restraint means 6 in method step 21." to -- collision is detected, and is confirmed in the steps of using an acceleration sensor to generate acceleration signals 19, comparing the acceleration signals to an enabling threshold value 20, and making a control decision to trigger a restraint system 21. For example, if the acceleration signal is greater than a threshold value for the acceleration in the lateral direction of a vehicle 20, then a triggering decision may be transmitted to the restraint system 6. --.
Lines 49-56, change "If it was determined in method step 18 that either the absolute temperature increase or the temperature gradient is below the individually specified threshold value, a return to method step 16 is implemented, and the instantaneous temperature value is checked. If it was detected in method step 20 that they signal of the acceleration sensor is below the specified enabling threshold, a return to method step 16 is also implemented to call up the ambient-temperature signal." to -- If either the temperature increase or the temperature gradient is less than their respective, individual threshold values, the specific method of detecting a side collision returns to the step of generating temperature signals, and the instantaneous temperature value is checked. Likewise, if the signal of the acceleration is less than the enabling threshold value, then the method of detecting a side collision returns to the step of generating temperature signals. --.

UNITED STATES PATENT AND TRADEMARK OFFICE
CERTIFICATE OF CORRECTION

PATENT NO. : 6,725,961 B2
DATED : April 27, 2004
INVENTOR(S) : Mattes et al.

It is certified that error appears in the above-identified patent and that said Letters Patent is hereby corrected as shown below:

Column 4, line 57-Column 5, line 29,

Change "Rapid information...the temperature rise." to

-- In one alternative embodiment, a side collision is detected rapidly even using a temperature sensor with a comparatively slow response to a temperature change $\Delta T$, by measuring the temperature gradient over a short period and calculating the actual temperature change of the air. For example, in the first 20 ms after the deformation of a side panel begins, the temperature increase occurs over time, according to an exponential function:

$$T(t) = \Delta T(1 - e^{-t/\tau}),$$

where $\tau$ is a thermal time constant of the air-temperature change in a cavity defined by a vehicle side panel. The thermal time constant is experimentally determined and, for example, may be assumed to be constant over both the temperature and the service life of the vehicle.

As an example of this alternative embodiment, if a temperature signal is generated after both a period of 0.5 ms and 2 ms from the onset of a side collision, then the expression above may be evaluated to obtain the following:

$$T(0.5ms) = \Delta T(1 - e^{-0.5ms/\tau}), \text{ and}$$

$$T(2ms) = \Delta T(1 - e^{-2ms/\tau}), \text{ respectively, and thus}$$

$$\Delta T = (T(2ms) - T(0.5\ ms)) / (e^{-0.5ms/\tau} - e^{-2ms/\tau}).$$

For example, take an increase in the temperature of the air in a cavity $\Delta T$ that is caused by a side collision. According to this equation, a temperature sensor will have a temperature signal that does not immediately reflect the true temperature change of the air. However, the temperature signal will start to respond immediately and will eventually approach the true temperature at a time greater than the thermal time constant. For example, a method of detecting a side collision that waits for a temperature signal that takes 50 ms to reach the air temperature, is much too late to be practical in triggering a restraint system. Nevertheless, the actual temperature change of the air within the cavity can be calculated using the equation after a mere 2ms if the thermal time constant is known, and with the aid of this "trick," the temperature change may be compared to a threshold value to detect a side collision within a practical time interval even for a temperature sensor with a comparatively large thermal time constant.

Another alternative embodiment of the invention evaluates the rate of temperature change with time (the first derivative of temperature with time). The actual temperature increase may be understood as a jump function, which may be modeled by an analog circuit, such as a thermal circuit diagram made of a thermal resistance R and a thermal capacitance. A differential equation is analyzed for the

UNITED STATES PATENT AND TRADEMARK OFFICE
CERTIFICATE OF CORRECTION

PATENT NO. : 6,725,961 B2
DATED : April 27, 2004
INVENTOR(S) : Mattes et al.

It is certified that error appears in the above-identified patent and that said Letters Patent is hereby corrected as shown below:

Column 4, line 57-Column 5, line 29 (cont'd), analog circuit, having a voltage cycle and the current equation. In one embodiment, the jump function is simulated by a sum of the weighted first derivative of the temperature with respect to time and the temperature variation per se. The correct choice of weighting results from the values for the thermal resistance and the thermal capacitance, which depend on the characteristic physical properties of the materials comprising the temperature sensor. Even using a temperature sensor with a slow response time, the information regarding the temperature rise may already be available after a few ms, by using the first derivative in this way. In another embodiment, only the first derivative of the temperature change with respect to time is used to predict the temperature rise and detect a side collision, without using the temperature variation itself. --.

Signed and Sealed this

Twenty-ninth Day of November, 2005

JON W. DUDAS
*Director of the United States Patent and Trademark Office*